United States Patent
Wheeler et al.

(10) Patent No.: US 7,519,802 B2
(45) Date of Patent: Apr. 14, 2009

(54) SYSTEM AND METHOD FOR CONFIGURING A COMPUTER SYSTEM

(75) Inventors: Andrew Ray Wheeler, Fort Collins, CO (US); James Robert Peterson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 10/838,981

(22) Filed: May 5, 2004

(65) Prior Publication Data

US 2005/0251640 A1    Nov. 10, 2005

(51) Int. Cl.
G06F 9/00 (2006.01)
G06F 9/24 (2006.01)
G06F 15/177 (2006.01)

(52) U.S. Cl. .................... 713/1; 713/2; 713/100
(58) Field of Classification Search ............. 713/1, 713/2, 100
See application file for complete search history.

(56) References Cited

U.S. PATENT DOCUMENTS

| | | | |
|---|---|---|---|
| 5,737,765 A * | 4/1998 | Shigeeda | 711/170 |
| 5,812,867 A * | 9/1998 | Basset | 712/1 |
| 5,859,987 A * | 1/1999 | Gillespie et al. | 710/311 |
| 6,073,233 A * | 6/2000 | Chapman | 713/1 |
| 6,167,365 A * | 12/2000 | Karthikeyan et al. | 703/28 |
| 6,178,501 B1 | 1/2001 | Ingalls | |
| 6,182,203 B1 | 1/2001 | Simar, Jr. et al. | |
| 6,578,186 B1 * | 6/2003 | Armstrong et al. | 716/16 |
| 6,587,909 B1 | 7/2003 | Olarig et al. | |
| 6,636,962 B1 * | 10/2003 | Sun et al. | 713/1 |
| 6,654,847 B1 | 11/2003 | Roohparvar et al. | |
| 6,657,899 B2 | 12/2003 | Roohparvar | |
| 6,713,778 B2 | 3/2004 | Maeda | |
| 7,043,393 B2 * | 5/2006 | Fuller et al. | 702/127 |
| 7,080,164 B2 * | 7/2006 | Jacobs et al. | 710/8 |
| 7,197,666 B1 * | 3/2007 | Yin | 714/23 |
| 7,213,142 B2 * | 5/2007 | Moore et al. | 713/100 |
| 7,219,167 B2 * | 5/2007 | Quach et al. | 710/8 |
| 7,266,680 B1 * | 9/2007 | Reinbold | 713/100 |
| 2002/0108032 A1 * | 8/2002 | Su et al. | 713/1 |
| 2003/0233534 A1 * | 12/2003 | Bernhard et al. | 713/1 |
| 2004/0221148 A1 * | 11/2004 | Su et al. | 713/1 |
| 2005/0066073 A1 * | 3/2005 | Jacobs et al. | 710/15 |
| 2005/0086456 A1 * | 4/2005 | Elboim et al. | 713/1 |

FOREIGN PATENT DOCUMENTS

EP    1215586 A2    6/2002

* cited by examiner

*Primary Examiner*—Thomas Lee
*Assistant Examiner*—Jaweed A Abbaszadeh

(57) ABSTRACT

Systems and methods for configuring a computer system are disclosed. One embodiment of a system may comprise memory that stores configuration data for a plurality of components of a computer system. A configuration system operates to access the configuration data from the memory and to program at least one of the plurality of components based on corresponding configuration data from the memory while inhibiting operation of at least another portion of the computer system.

24 Claims, 4 Drawing Sheets

SYSTEM AND METHOD FOR CONFIGURING A COMPUTER SYSTEM

BACKGROUND

In order for different components to communicate in a computer system, one or more functional and electrical parameters for such components are configured. For instance, as part of a boot process, one or more processors can load operating system and other basic software sufficient to implement a configuration process for programming required parameters to enable interoperability among components in the system. Another approach to configure components in the computer system employs a dedicated memory to program each respective component. While the dedicated memory may enable more rapid configuration than the processor-based software approach, there usually is an increased cost and system complexity to utilize such dedicated memory.

SUMMARY

One embodiment of the present invention may comprise a system having a memory that stores configuration data for a plurality of components of a computer system. A configuration system operates to access the configuration data from the memory and to program at least one of the plurality of components based on corresponding configuration data from the memory while inhibiting operation of at least another portion of the computer system.

Another embodiment of the present invention may comprise a computer system that includes at least one processor and a plurality of control registers, each having a value that defines at least one operating characteristic for an associated component of the computer system. Memory stores configuration data for at least some of the plurality of control registers. A configuration system operates in a configuration mode associated with a boot process of the at least one processor, the configuration system accessing the configuration data to program at least one of the plurality of control registers with corresponding configuration data as part of the configuration mode.

Another embodiment of the present invention may comprise a system that includes means for inhibiting operation of at least a portion of a computer system during a configuration mode, and means for, during the configuration mode, accessing configuration data from associated memory and for programming a plurality control registers based on corresponding configuration data accessed from the associated memory.

Another embodiment of the present invention may comprise a method that includes acquiring configuration data from memory for at least some of a plurality of components of a computer system during a configuration mode of the computer system. Operation of at least one processor is inhibited during the configuration mode. The at least some of the plurality of components are programmed with corresponding configuration data acquired from the memory.

DETAILED DESCRIPTION

Figure 1:
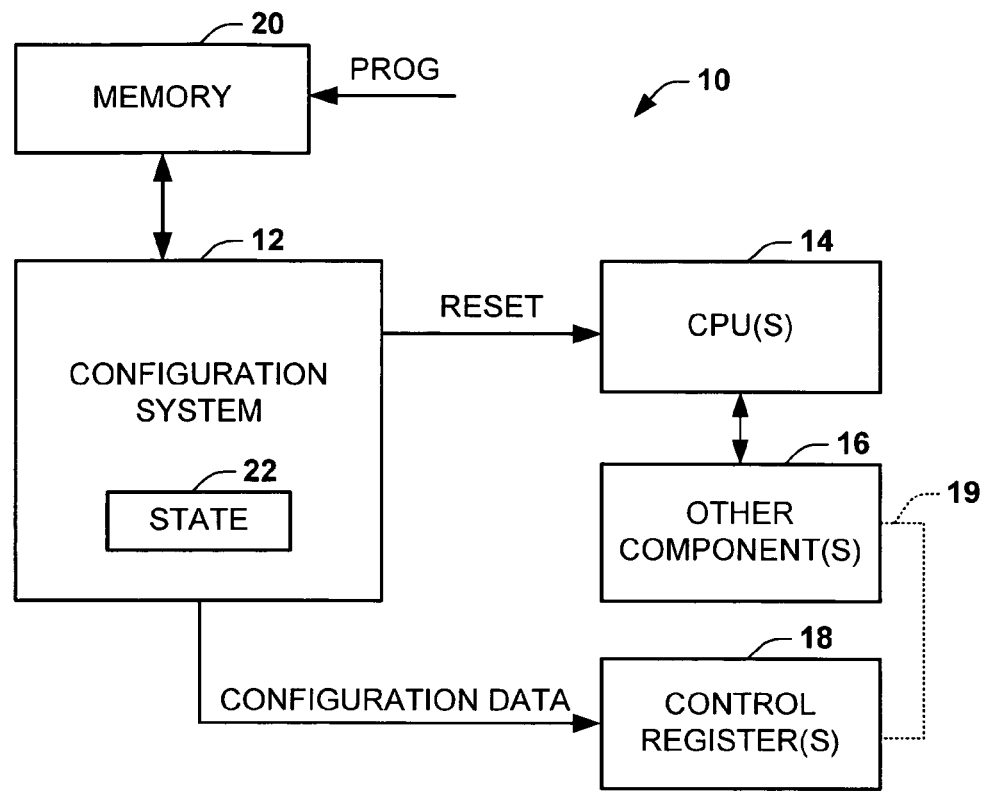
FIG. 1 depicts an embodiment of a system for configuring a computer system.

FIG. 1 depicts an example of a computer system 10 that implements a configuration system 12. The configuration system 12 is operative to configure the computer system 10. For example, the configuration system 12 can configure parameters, such as electrical and/or functional parameters, of one or more components of the computer system 10. The configuration system 12 may operate as part of an early turn on mode of operation for the computer system 10. The early turn-on mode can be implemented before system firmware is executed during a normal boot process of the computer system 10. Since the configuration system 12 is operative to set the parameters to legal values before firmware execution, the overall system boot time can be decreased and interoperability of the system components can be ensured.

By way of example, the computer system 10 includes one or more central processing units (CPUs) 14. When more than one CPU 14 is implemented, the CPUs can be coupled together via a processor bus. Alternatively, the CPUs can be distributed throughout the computer system 10 in any desired multiprocessor architecture. The computer system 10 also includes one or more other components 16 having one or more programmable control registers 18 associated with such components (such associated indicated schematically by a dotted line 19). The control registers 18, for example, define operating characteristics for at least some of the components 16, including electrical and functional parameters thereof.

To enable interoperability between the CPU(s) 14 and the other components 16 in the computer system 10, the control registers 18 are programmed based on configuration data. In particular, the configuration system 12 programs the control registers 18 with predetermined values to provide for interoperability and communication among the other components 16 and the CPU(s) 14 in the computer system 10. For instance, by setting the parameters to legal values, communication between the other components 16 and the CPU(s) 14 can occur over a system bus (not shown), which interconnects such components with the CPU(s).

Corresponding configuration data for each of the respective control registers 18 can be stored in memory 20. The memory 20 can be implemented internally or externally relative to a main chipset that forms computer system 10. The memory 20 can be implemented as one or more non-volatile memory devices that are programmed to include configuration data for the respective control registers 18. For example, the memory 20 can be implemented as read only memory (ROM), programmable ROM (PROM), erasable PROM (EPROM, such as flash memory), battery-backed memory, or any other non-volatile storage media accessible by the configuration system 12. As an example, the configuration system 12 can access the memory 20 via a high speed data link.

It is to be appreciated that the memory 20 can be a multi-purpose memory that includes configuration data for programming the respective control registers 18 as well as data for other purposes for use in the computer system 10 (e.g., BIOS instructions for the boot process). Since multi-purpose memory can be utilized, reduced equipment costs can be utilized to implement the computer system 10 when compared to many other types of systems.

As mentioned above, the memory 20 can also be programmable, such as based upon a PROG input signal. The PROG input signal can be provided to the memory 20, such as from one or more of the CPU(s) 14 of the computer system 10, or from another interface to facilitate programming of the configuration data from a variety of sources. For instance, a system administrator can selectively program new configuration values for one or more of the control registers without having to upload a complete firmware image into the respective memory 20.

While the memory 20 is depicted as a single block, those skilled in the art will further understand that the memory can be implemented as one or more non-volatile memory devices. For instance, the configuration data for various control registers 18 can be stored in different memory devices distributed across the computer system (e.g., in a distributed memory architecture) or, alternatively, stored in corresponding memory locations of a single, local memory device. The particular arrangement of the memory and data structure that forms the configuration data image generally can vary based on the type of computer system 10.

The configuration system 12 operates in at least two modes, one of which (e.g., a configuration mode) enables the configuration system to access the configuration data from the memory 20 and to program the control registers 18. In the other operating mode, the configuration system is disabled from programming the control registers. The operating mode of the configuration system 12 can vary as a function of state information 22, which can be set or programmed to a value that defines the operating mode.

As an example, at power up or at some point early in a boot process being implemented by the CPU(s) 14, the state information 22 of configuration system 12 is set to a value corresponding to the first operating mode (e.g., an early turn-on or configuration mode). In this first operating mode, the configuration system 12 inhibits operation of at least another portion of the computer system 10. For instance, the configuration system 12 can inhibit operation of the CPU(s) 14 by providing a RESET signal to the CPU(s) 14. While the configuration system 12 holds the CPU(s) 14 in reset, normal progress of the boot process by the CPU(s) 14 is deferred. As a result, operation of other components 16 of the computer system 10 is effectively suspended to facilitate configuring the control registers 18 during the configuration mode.

While configuration system 12 holds the CPU(s) 14 in reset during the configuration mode, the configuration system 12 accesses the configuration data from the memory 20 and, in turn, programs the control registers 18 with respective configuration data. For instance, the configuration data can be stored in the memory 20 as a configuration data image that includes configuration data packets. Each packet of configuration data obtained from the memory 20 can include a system address that maps to a respective one of the control registers 18. As a result, predetermined configuration data can be targeted for programming desired electrical as well as functional characteristics of the each of the respective components 16 in the computer system 10. By programming electrical and/or functional properties of the various components in the computer system 10 directly from the memory 20 and without involving software being executed by the CPU(s) 14, the overall boot time associated with the computer system 10 can be significantly decreased.

After the configuration system 12 has programmed the control registers, the state information 22 of the configuration system can be set to operate the configuration system in the second operating mode. In the second operating mode, the configuration system 12 releases the CPU(s) 14 from reset so that the CPU(s) can resume normal operation, including a continuation of the boot process. As one example, a last-to-be-accessed configuration data packet in the memory 20 can be employed to reprogram the state information 22 to the second operating mode, and thereby terminate the configuration process. In response to changing the state information 22, the configuration system 12 changes (or discontinues) the value of the RESET signal, which releases the CPU(s) 14 and the other components 16. Consequently, after the configuration process, the normal boot process, as may be implemented by one or more of the CPU(s), can continue.

Since the control registers 18 have already been programmed with configuration data, electrical and functional properties for respective interfaces associated with the control registers 18 can be configured before the interfaces are used. As a result, communication and interoperability among components in the computer system 10 is facilitated. Additionally, by programming the control registers directly from the memory 20, the overall boot time can be decreased. For example, the configuration system 12 mitigates the need for multiple reboot processes, which can occur when configuring clock ratios and configuring various subsystems across the computer system 10.

Figure 2:
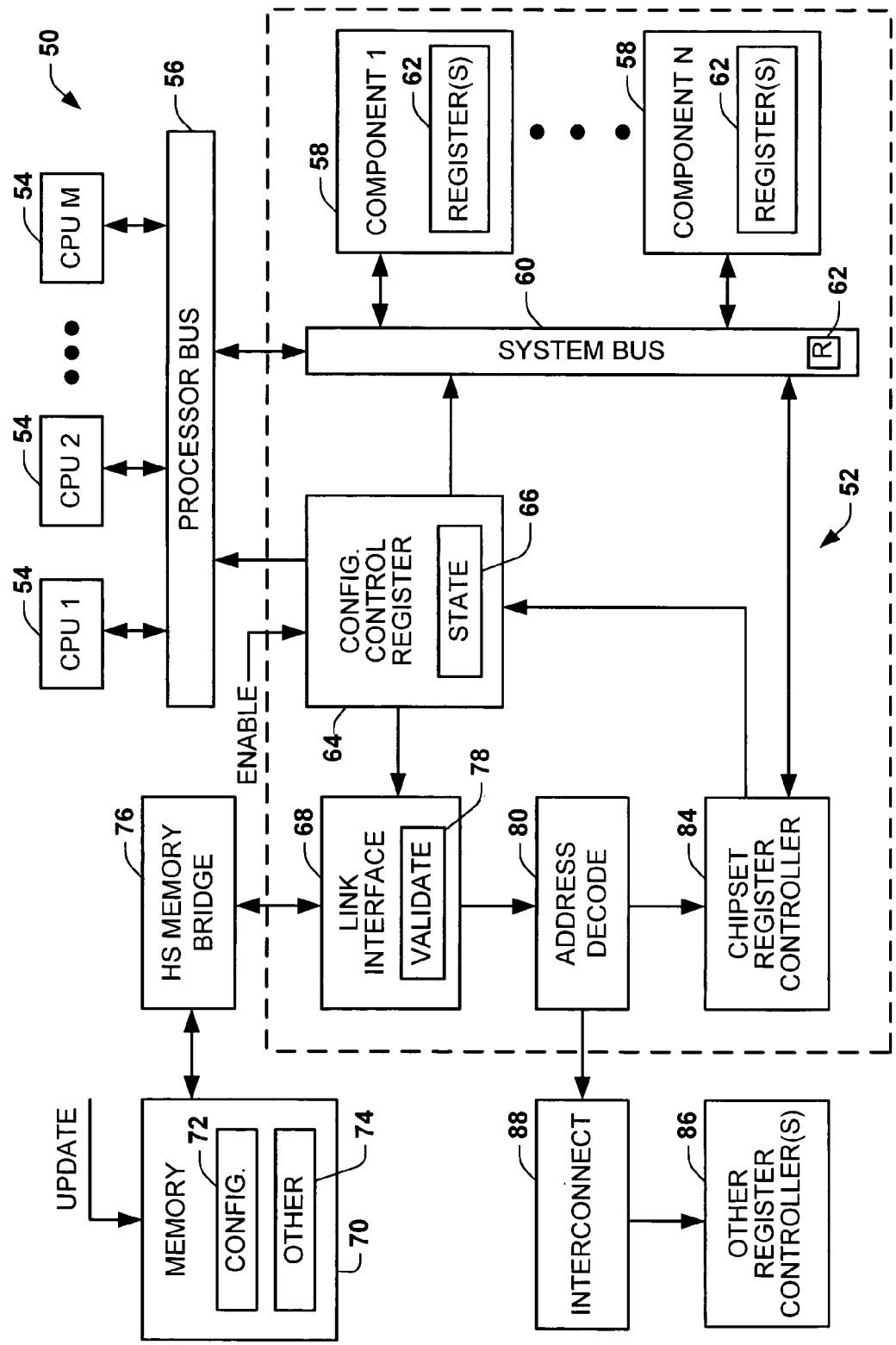
FIG. 2 depicts another embodiment of a system for configuring a computer system.

FIG. 2 depicts an example of another computer system 50 that includes a configuration system 52. The configuration system 52 is operative to program one or more electrical or functional parameters associated with the computer system 50 to facilitate operation thereof. In the example of FIG. 2, the computer system 50 includes one or more processors 54 indicated at CPU 1, CPU 2 and CPU M, where M is an integer denoting the number of processors. The processors 54 are communicatively coupled via a processor bus 56. The processor bus 56 can include one or more interconnects (e.g., a switch fabric) that enables communication between the processors 54. The processor bus 56 can also be implemented to provide for communication between one or more processor boards, such as cell boards in a multi-processor distributed computer architecture.

The computer system 50 also includes one or more components 58, indicated at components 1-N, where N is integer denoting the number of other components in the computer system 50. Examples of components may include interfaces, input/output drivers, receivers, interconnects, memory, clock circuitry, voltage sources, adapters or other hardware components utilized in the computer system 50. The components 58 can be interconnected with the CPUs 54 via a computer system bus 60. The system bus 60 can include an arrangement of one or more interconnects that provides for local and/or global communication across the computer system 50. In general, the arrangement and communicative nature of the system bus 60 depends on the type of computer system 50 being implemented.

Associated with one or more of the components 58 are system control registers (e.g., also referred to as control status registers (CSR's) or mode registers) 62. There can be one or more control registers 62 associated with each of the components 58, including associated with the system bus 60 and other bus structures in the computer system 50. The control registers 62 can be programmed with register values, such as single or multi-bit control words, to define a mode of operation for corresponding components in the computer system 50. The control registers 62, for example, can be programmed with values to set electrical characteristics associated with corresponding components (e.g., slew rates for buses). Additionally or alternatively, the control registers 62 can be programmed with values to set functional parameters utilized for configuring and synchronizing subsystems within the computer system 50. For instance, the control registers 62 can be programmed to define clock ratios (e.g., between memory and processor clocks), to allocate memory for various components, to establish protocols being implemented, as well as to set other functional features associated with various components in the computer system 50.

The configuration system 52 also includes a configuration control register 64. The configuration control register 64 operates to control a configuration mode for the computer system 50 based on a value of state information 66 programmed in the control register. The state information 66, for instance, can be set to a first value that defines the configuration mode in which the configuration process is implemented. The state information 66 can also be set to a second value when the configuration process has been completed. That is, the state information 66 can correspond to a value (e.g., a single bit in the control register 64) corresponding to a configuration mode associated with the computer system 50. The configuration mode can be implemented in conjunction with an early stage of a boot process, such as at power up (e.g., an early turn-on mode of operation) for the computer system 50.

For example, an ENABLE signal can be provided to the control register 64, such as through a pin-strapping operation of corresponding circuitry to, in turn, enable the configuration mode of the configuration system 52. When the configuration system 52 is enabled, the configuration control register 64 can provide signals to various components in the system, such as to reset system registers 62 associated with such components to preprogrammed default values. The default values for the control registers 62 typically are hard-coded at the time of manufacture. Accordingly, it is often necessary to re-program the registers 62 since the requirements of the computer system 50 often change and different values may be needed to implement desired optimizations thereof.

In the configuration mode, the configuration control register 64 also provides a control signal to the one or more CPUs 54 to inhibit operation thereof. For example, the configuration control register 64 can provide a reset signal to the CPUs 54 via the processor bus 56 to hold such CPUs in reset during the configuration mode. Alternatively, the reset signal can be provided directly to the CPUs 54. The reset signal to the CPUs 54 operates to hold the computer system in reset to allow for configuration by the configuration system 52. The state (or value) of the reset signal provided to the CPUs 54 can vary as a function of the state information 66 stored in the control register 64.

As part of the configuration mode, the configuration control register 64 obtains configuration data from associated memory 70 for programming the system control registers 62. For example, the memory 70 includes a configuration data image 72 for the computer system 50 that having data packets programmed to set the registers 62 to provide for desired interoperability and operation of the computer system 50. The configuration data packets include values for configuring electrical and functional parameters. The configuration data image 72, for example, can be programmed by a manufacturer of the computer system 50. Alternatively or additionally, the configuration data image 72 can be updated or reprogrammed, in whole or in part, based upon an UPDATE program signal provided to the memory 70. The UPDATE signal can be provided by one or more CPUs 54 and/or remotely (e.g., by an administrator via an associated terminal).

The memory 70 can be implemented as a multi-purpose non-volatile memory that may also store other data 74 associated with the operation of the computer system 50. Those skilled in the art will understand and appreciate various types of non-volatile memory that can be utilized to implement the memory 70 that includes the configuration data image 72. For instance, the memory 70 can include boot ROM, PROM, EPROM (e.g., flash EPROM), or other battery backed non-volatile auxiliary memory associated with the computer system 50. The memory 70 is coupled to the computer system 50 via a high-speed memory bridge 76. The high speed memory bridge 76, for example, can be implemented as circuitry (e.g., an IC chip) that provides an interface to industry standard memory 70 to provide a high speed data link, which can reduce the chipset pin count associated with the computer system 50.

A link interface 68 receives the configuration data packets from the memory 70 via the HS memory bridge 76. The link interface 68 includes a validation component 78 that validates the configuration data packets. As an example, the validation component 78 employs a check sum in the configuration data image 72 to ascertain the validity of the configuration data in the configuration data image. If the check sum does not compute correctly, for example, the configuration data can be discarded and other backup means (e.g., software and/or hardware) employed to program the respective control registers 62. Provided that the configuration data validates properly, the link interface 68 extracts at address and data fields from respective data packets for use in programming corresponding control registers 62.

In the example of FIG. 2, the link interface 68 provides the extracted address and configuration data to an address decode block (e.g., decoder circuitry) 80. The address decode block 80 determines where in the computer system 50 the extracted address and configuration data is to be routed. In the example of FIG. 2, the components 58 and associated control registers 62 form part of a local chipset 82. Thus, when the address associated with the extracted configuration data corresponds to a local address, for example, the address decode block 80 can provide decoded address and configuration data to a corresponding local chipset register controller 84. The chipset register controller 84 is operative to program the respective control registers 62 with configuration data based on the address associated with configuration data. For instance, the chipset register controller 84 is coupled to route configuration data to the control registers 62 via the system bus 60 based on the decoded system address.

Alternatively, if the address decode block 80 determines that the address is associated with a control register not local to the chipset 82, and thus inaccessible for programming by the chipset register controller 84, the address decode block 80 can route the extracted address and configuration data to one or more other registered controllers 86 via a corresponding interconnect 88. The interconnect 88, for example, can couple the chipset 82 with one or more other corresponding chipsets (not shown) that contain the one or more other register controllers 86 and associated control registers (not shown).

Those skilled in the art will understand and appreciate that one or more such interconnects 88 and register controllers 86 can be utilized to provide larger, more complex computer systems, such as distributed multi-processor computer architectures containing a plurality of cell boards. In such a multi-cell board computer system 50, the memory 70 can contain appropriate configuration data for performing an early turn-on mode of operation for the entire computer system. Alternatively, suitable memory can be provided at more than one cell board to store corresponding configuration data for implementing the configuration process, as described herein. Thus, the configuration data image 72 programmed in the memory 70 can be scaleable along with the computer system 50. For example, as the computer system 50 is scaled up to implement larger, multi-processor distributed computer systems, the configuration data image 72 can also be programmed via the UPDATE signal accordingly to accommodate such scaling.

The chipset register controller 84 can also program the state information 66 of the configuration control register 64 to end the early turn-on configuration mode. For instance, the state information 66 can be reprogrammed upon completion of the early turn-on mode of operation, namely, after the respective control registers 62 have been programmed to set desired electrical and functional parameters in the computer system 50. As an example, a last accessed data packet in the configuration data image 72 can include configuration data addressed to write to the state information 66 of the configuration control register 64. Since the configuration data packet has the system address for the configuration control register 64 in the chipset 82, the address decode block 80 provides decoded address and corresponding configuration data to the chipset register controller 84. The chipset register controller 84 in turn provides corresponding configuration data to program the state register information 66 to a value that terminates the early turn-on mode of operation in the computer systems 50. In response to the state information 66 being set to terminate the early turn-on mode of operation, the configuration control register 54 can release the CPUs 54 from the reset state. As a result, the entire computer system 50 can resume a normal operation, including remaining portions of a boot process implemented by the CPUs 54.

By way of further example, a first portion of the state information 66 (e.g., a one-bit register entry) can be set based on the configuration data to indicate that the early turn-on mode of operation is finished. A second portion (e.g., a one or more bit entry) in the state information 66 can be utilized to drive the reset signal that holds the CPUs 54 (and the rest of the system 50) in the reset state during the early turn-on mode of operation. The second portion of the state information 66 is also modified when the first portion of the state information is written to end the early turn-on mode of operation.

Figure 3:
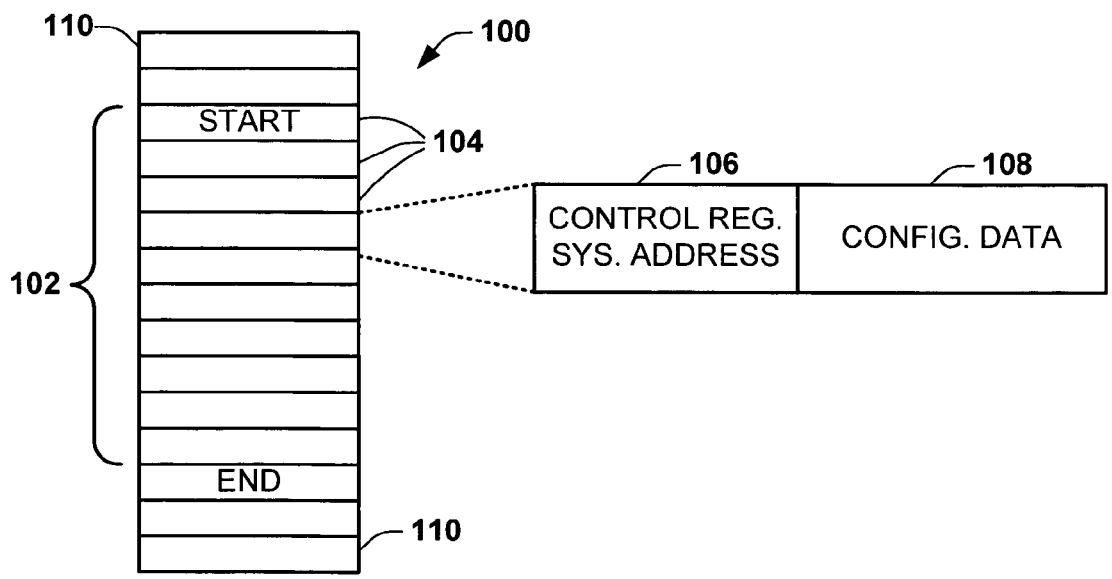
FIG. 3 depicts an example of a data structure that can be utilized by an embodiment of a configuration system.

FIG. 3 depicts an example of memory structure 100 that can be programmed with a configuration data image, schematically indicated at 102. The configuration data image 102 is utilized to program a plurality of control registers with corresponding electrical and/or functional parameters to enable interoperation of various components in a computer system. The configuration data image 102 includes a plurality of data packets 104 stored at various memory locations in the memory 100. Within the memory structure 100, a first accessed data packet associated with the configuration data image 102 provides a START address in the memory structure 100.

The START address can correspond to a memory location in the memory structure 100 that contains a first data packet that is to be utilized for programming corresponding control registers in the computer system. Alternatively, the START address can identify (or point to) one or more other memory locations in the memory structure 100 for vectoring off and accessing configuration data for programming the respective control registers. The START address location in the memory structure 100 can be hard-coded in the configuration system (e.g., in the link interface 68 of FIG. 2) to enable access to the configuration data image in connection with implementing an early turn-on mode of operation by the configuration system.

Those skilled in the art will understand and appreciate that the memory structure 100 can be implemented in one or more non-volatile storage devices (e.g., ROM, PROM, EPROM or the like). While, for purposes of simplicity of illustration, the data packets 104 of the configuration data image 102 are depicted as occupying a contiguous array of memory locations, the packets 104 may be arranged as contiguous or non-contiguous data in one or more memory devices. For example, the data packets 104 can be spaced apart or interleaved in any desired fashion according to the implementation of the memory structure 100.

As shown in FIG. 3, each data packet 104 includes at least a control register system address 106 and configuration data 108. The control register system address 106 corresponds to an encoded system address associated with a given control register that is to be programmed with the associated configuration data 108. That is, the control register system address 106 can be decoded (e.g., by the address decode block 80 of FIG. 2) to identify a system address for a given chip or component thereof in the computer system that is to be programmed with the configuration data 108. As mentioned above, the configuration data 108 can include one or more values (e.g., a multi-bit data field) to set desired electrical and/or functional parameters of the component identified by the system address 106.

The memory structure 100 can include other data 110, such as can be utilized by the computer system for other purposes, such as by processors during subsequent portions of a normal boot process. By storing the configuration data in existing memory of a computer system, the configuration data can be stored for access by a configuration system at reduced system cost compared to other approaches that employ dedicated separate memory for storing configuration data.

Figure 4:
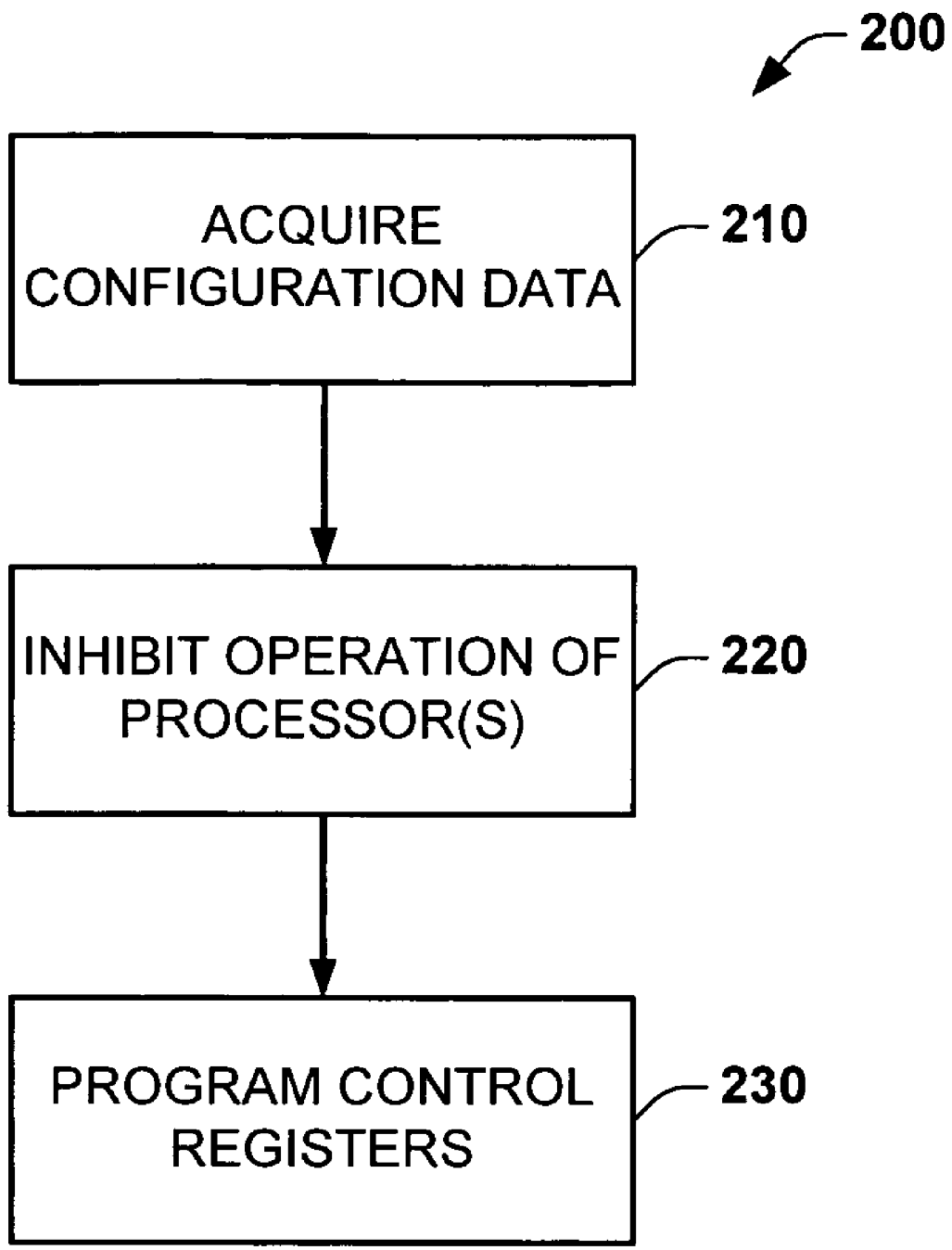
FIG. 4 is a flow diagram depicting an embodiment of a method for configuring a computer system.
Figure 5:
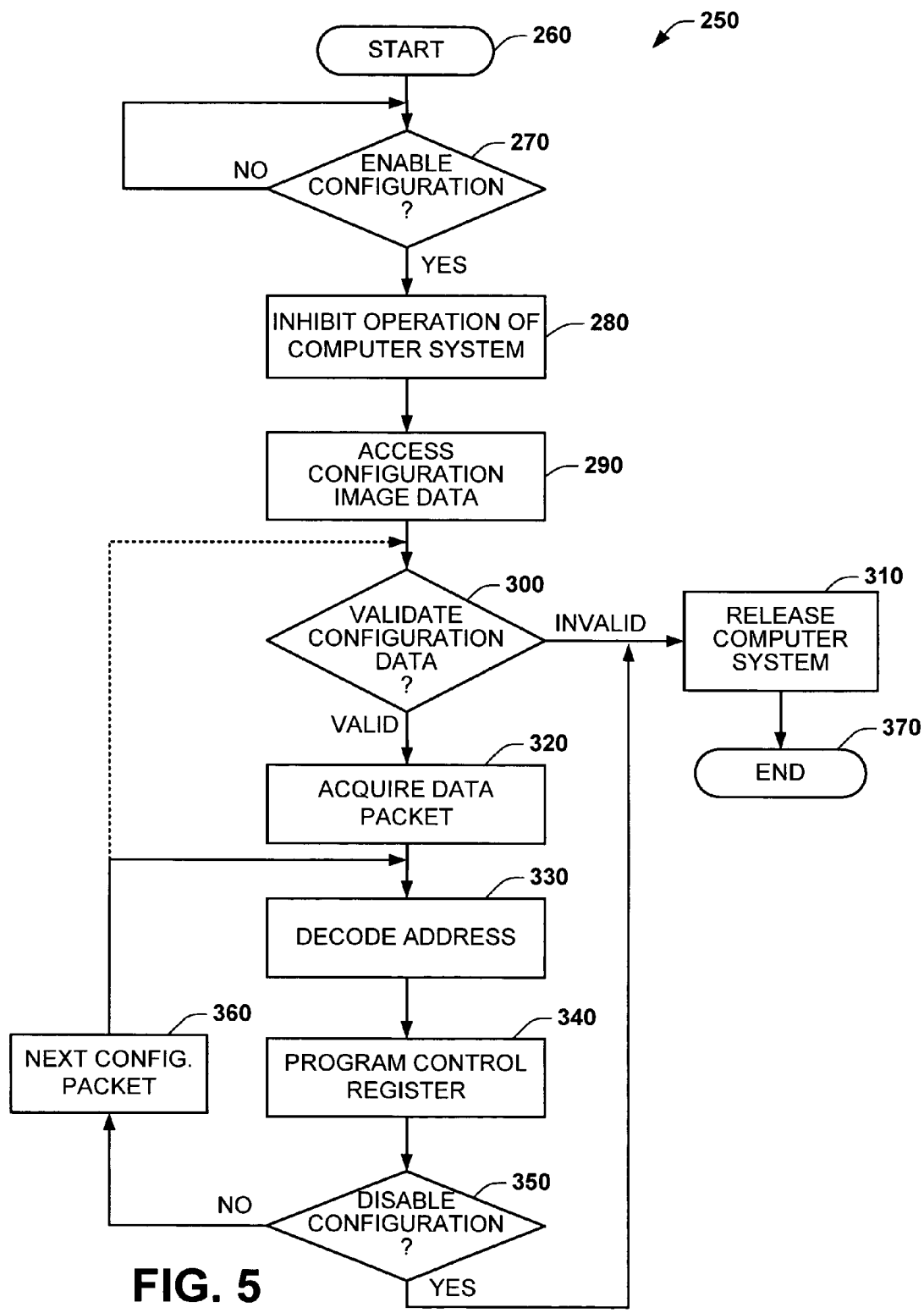
FIG. 5 is a flow diagram depicting another embodiment of a method for configuring a computer system.

In view of the foregoing structural and functional features described above, certain methods will be better appreciated with reference to FIGS. 4 and 5. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), firmware (e.g., as executable instructions running on one or more processors or controllers), or any combination thereof.

FIG. 4 depicts an example of a method 200. The method 200 comprises acquiring configuration data from memory for at least some of a plurality of components of a computer system during a configuration mode of the computer system, as shown at 210. The method also includes inhibiting operation of at least one processor during the configuration mode, as shown at 220. The method also includes programming the at least some of the plurality of components with corresponding configuration data acquired from the memory, as shown at 230.

FIG. 5 depicts a flow diagram of a method 250 for configuring a computer system. The method begins at 260, such as in conjunction with a boot process. As an example, the method can begin (260) at power-up or in response to resetting or otherwise rebooting the computer system implementing the method 250. At 270, a determination is made as to whether a configuration mode has been enabled. If the configuration mode has not been enabled (NO), the method can loop at 270, and thereby enable normal operation of the computer system. The configuration mode can be enabled, for example, based on an enable control line associated with powering up the computer system (e.g., as part of a pin-strapping operation in circuitry configured to implement the method 250).

If the configuration mode is enabled at 270 (YES), the method proceeds to 280. At 280, operation of at least part of the computer system is inhibited. Such operation can be inhibited, for example, by setting a bit of a control register that, in turn, holds at least another portion of the computer system in reset. By holding the one or more processors in reset, operation of a substantial portion of the computer system can be effectively suspended. At 290, configuration image data is accessed. The configuration image data, for example, can be stored in non-volatile memory of the computer system, which may be internal or external relative to a main chipset thereof. The configuration image data can include configuration data for a plurality of control registers. The configuration data can be preprogrammed for setting desired electrical and functional parameters of the computer system.

At 300, the configuration data is validated. As one example, the validation at 300 can be implemented on the entire configuration image data for the computer system. For instance, the validation can be performed based on a check sum associated with the stored configuration data image. Alternatively, the validation can be performed for each of a plurality of data packets that comprise the configuration data image. For purposes of brevity and ease of explanation, the following example assumes that the validation at 300 is implemented for the entire image data. Accordingly, if the configuration data does not validate (INVALID), the method proceeds from 300 to 310 in which the computer system is released from the configuration mode.

The computer system can be released, for example, so that other means can be utilized to configure the system control registers of the computer system. As one example, one or more processors in the computer system can execute code during the boot process to program the respective control registers in the computer system. Such a configuration process would typically be implemented by the one or more processors in a subsequent phase of the boot process. The processor-based configuration may involve accessing executable instructions from memory and then executing such instructions to provide interoperability and communication between such components and the processors. As a result, the software configuration approach typically adds substantial additional time to the boot process.

If the configuration data has been validated at 300 (VALID), the method proceeds from 300 to 320. At 320, a configuration data packet is acquired from memory. For example, the configuration data packet can be accessed over a high-speed, multi-bit data link. At 330, an address in the configuration data packet data is decoded. The decoded address corresponds to a system address for routing the configuration data in the data packet acquired at 320.

At 340, a control register identified by the decoded address is programmed with the configuration data. As described herein, the configuration data can set one or more electrical parameters by setting the control register to a predetermined value. The predetermined value can be determined by the manufacture of the computer system or, alternatively, during system operation (e.g., as part of a system optimization or processor-based configuration process). Additionally, the configuration data that is programmed to the control register can be modified or updated, as needed. The control register can be programmed by a corresponding register controller associated with a bus or other connection coupling the register controller with the control register.

At 350, a determination is made as to whether the configuration data packet utilized to program the control register at 340 includes data to disable the configuration mode. If additional configuration data exists (NO), the method proceeds from 350 to 360 to obtain the next configuration data packet. From 360 the method returns to 330 in which the address associated with the next configuration packet is decoded. The method can loop between 330 and 360 until all the configuration data packets have been acquired from memory, decoded and utilized to program the corresponding control registers. Alternatively, as indicated by the dotted line from 360 to 300, each configuration packet can be validated independently as part of the configuration mode. In this way, the invalid configuration data packets can be identified so that corresponding control registers can be programmed by other means, including by software mechanisms during the subsequent portion of a boot process. Alternatively, the invalid configuration data packets can be written and stored in a log file that can be accessed to enable subsequent manual updating.

After the last configuration data packet has been utilized to program a corresponding control register in the computer system, configuration data can be utilized to disable the configuration mode. In response to disabling the configuration mode at 350 (YES), proceeds. The method proceeds from 350 to 310 to release the computer system. When the configuration process ends at 370, a remaining portion of a boot process can be resumed by one or more processors of the computer system. By configuring electrical and functional parameters according to the method 250, the overall boot time can be significantly reduced. Additional cost reductions can be achieved by employing existing system memory to store the configuration data image.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer system, comprising:
at least one processor;
a plurality of control registers, each having a value that defines at least one operating characteristic for an associated component of the computer system;
memory that stores configuration data for at least some of the plurality of control registers;
a configuration system that operates in a configuration mode associated with a boot process of the at least one processor, the configuration system accessing the configuration data to program at least one of the plurality of control registers with corresponding configuration data as part of the configuration mode;
a register controller coupled to program at least some of the plurality of control registers;
a configuration control register having state information that is programmed with a first value to cause the configuration system to enter the configuration mode, the configuration control register being programmed with a second value to terminate the configuration mode in response to corresponding configuration data from the memory, the configuration control register being communicatively coupled to cause the at least one processor of the computer system to operate in a reset mode that inhibits operation thereof based on the state information being programmed with the first value; and
an address decoder that routes the configuration data to the register controller for programming the state information of the configuration control register and for programming the at least some of the plurality of control registers based on system address data stored in association with the configuration data in the memory.

2. The system of claim 1, wherein the configuration system inhibits operation of the at least one processor of the computer system during the configuration mode.

3. The system of claim 2, wherein the configuration system provides a reset signal to inhibit operation of the at least one processor of the computer system during the configuration mode, the reset signal operating to defer progress of the boot process of the at least one processor of the computer system.

4. The system of claim 1, wherein the configuration data in the memory includes a configuration data packet having an address field for programming the state information of the configuration control register to the second value for terminating the configuration mode, the configuration control register releasing the at least one processor from the reset mode based on the state information having the second value.

5. The system of claim 1, wherein the configuration data further comprises a plurality of configuration data packets, each configuration data packet including an address field and a configuration data field associated with a respective one of the plurality of control registers.

6. The system of claim 1, wherein the memory comprises non-volatile memory communicatively coupled with the configuration system via a data link.

7. A method comprising:
acquiring data packets from memory for at least some of a plurality of components of a computer system during a configuration mode of the computer system;
inhibiting operation of at least one processor during the configuration mode based on a first value being programmed to state information in one of a plurality of control registers, remaining control registers of the plurality of control registers each being associated with a respective one of the at least some of the plurality of components;
programming remaining control registers of the plurality of control registers, which are associated with the at least some of the plurality of components, with corresponding configuration data in the respective data packets acquired from the memory based on address data also in the respective data packets acquired from the memory, and
allowing operation of the at least one processor in response to a second value programmed to state information in the one of the plurality of control registers.

8. The method of claim 7, further comprising validating the configuration data and performing the programming of the at least some of the plurality of components with corresponding configuration data based on the validation of the configuration data.

9. The method of claim 7, further comprising:
decoding an address field from each of a plurality of data packets that provide the configuration data; and
routing at least a portion of the configuration data from a respective one of the plurality of data packets to program a corresponding one of the plurality of control registers based on the decoded address field.

10. A computer system, comprising:
at least one processor;
a plurality of control registers, each having a value that defines at least one operating characteristic for an associated component of the computer system;
memory that stores configuration data for at least some of the plurality of control registers, the configuration data comprising a plurality of data packets;
a configuration system that operates in a configuration mode associated with a boot process of the at least one processor, the configuration system accessing the configuration data to program at least one of the plurality of control registers with corresponding configuration data as part of the configuration mode, the configuration system inhibiting operation of the at least one processor of the computer system during the configuration mode;
a validation component that validates the configuration data from the memory prior to the configuration system programming the at least one of the plurality of components with the corresponding configuration data; and
an address decoder that routes the respective data packet, if validated by the validation component, to the register controller for programming a corresponding one of a plurality of control registers based on address data that is stored in each of the plurality of data packets.

11. The system of claim 10, wherein the validation component validates a configuration data image prior to programming the at least one of the plurality of components, the configuration system releasing the at least one processor from the configuration mode to resume operation thereof if the configuration data image is not validated by the validation component.

12. The system of claim 10, wherein the configuration data further comprises a sequence of configuration data packets, each configuration data packet including an address field and a configuration data field, a last configuration data packet in the sequence having an address field for programming the state information of the configuration control register to terminate the configuration mode and to release the at least one processor.

13. A system comprising:
memory that stores configuration data for a plurality of components of a computer system;
a plurality of control registers, a portion of the plurality of control registers being associated with the plurality of components, one of the plurality of control registers being a configuration control register;
a configuration system configured to access the configuration data from the memory during a configuration mode to program each of the portion of the plurality of control registers with corresponding configuration data from the memory to program the associated plurality of components with at least one functional parameter and at least one electrical parameter; and
the configuration control register comprising state information that controls a mode of the configuration system, the state information of the configuration control register being set to a first value to enter the configuration system into the configuration mode so that the operation of at least another portion of the computer system is inhibited during the configuration mode, the state information being changed from the first value to a second value to release the configuration system from the configuration mode and to cause the operation of the at least another portion of the computer system to resume.

14. The system of claim 13, wherein the at least another portion of the computer system comprises at least one processor of the computer system.

15. The system of claim 14, wherein the configuration system is communicatively coupled to cause the at least one processor of the computer system to operate in a reset mode to inhibit operation thereof during a configuration mode implemented by the configuration system.

16. The system of claim 15, wherein the reset mode causes the at least one processor to defer a normal boot process during the configuration mode.

17. The system of claim 13, wherein the configuration system further comprises an address decoder that routes the configuration data to a register controller for programming a corresponding one of a plurality of control registers based on system address data stored in association with the configuration data in the memory.

18. The system of claim 13, wherein the configuration system is programmed to access the configuration data at a preprogrammed base address location in the memory, the configuration data including configuration data packets for a plurality of control registers associated with the plurality of components.

19. The system of claim 13, wherein the configuration data in the memory includes a configuration data packet having an address field for programming the state information of the configuration control register based on associated configuration data to terminate the configuration mode.

20. The system of claim 13, wherein the configuration control register is communicatively coupled to cause at least one processor of the computer system to operate in a reset mode that inhibits operation thereof during the configuration mode.

21. The system of claim 13, wherein the memory further comprises non-volatile memory communicatively coupled with the configuration system via a data link.

22. The system of claim 21, wherein the memory includes at least one input for updating at least a portion of the configuration data stored in the memory.

23. The system of claim 13, wherein the configuration control register sets the state information to the second value in response to predefined configuration data accessed by the configuration system from the memory.

24. The system of claim 13, further comprising a validation component that validates the configuration data prior to programming the at least one of the plurality of components.

* * * * *